United States Patent [19]

Romes

[11] 4,427,075
[45] Jan. 24, 1984

[54] ELECTROHYDRAULIC CONTROL DEVICE FOR USE IN AGRICULTURAL MACHINES

[75] Inventor: Roman Romes, Friolzheim, Fed. Rep. of Germany

[73] Assignee: Robert Bosch GmbH, Stuttgart, Fed. Rep. of Germany

[21] Appl. No.: 230,583

[22] Filed: Feb. 2, 1981

[30] Foreign Application Priority Data

Feb. 8, 1980 [DE] Fed. Rep. of Germany ....... 3004592

[51] Int. Cl.³ .......................................... A01B 63/112
[52] U.S. Cl. ...................................... 172/7; 73/862.69
[58] Field of Search .................... 172/7, 9, 10; 73/862.48, 862.57, 862.67, 862.68, 862.69

[56] References Cited

U.S. PATENT DOCUMENTS

| | | | |
|---|---|---|---|
| 3,246,701 | 4/1966 | Schulz | 172/9 |
| 3,903,739 | 9/1975 | Kolavcic | 73/862.69 |
| 3,994,348 | 11/1976 | Schowalter | 172/9 |
| 4,088,013 | 5/1978 | Dahle et al. | 73/862.69 X |
| 4,271,910 | 6/1981 | Schafer | 172/7 |

FOREIGN PATENT DOCUMENTS 240303 8/1969 U.S.S.R. ........................... 73/862.69

Primary Examiner—Richard T. Stouffer
Attorney, Agent, or Firm—Michael J. Striker

[57] ABSTRACT

An electrohydraulic control device for a lifting unit of an agricultural machine having a frame and a control rod pivotally secured to the frame by a fixed pivot pin, includes a transformer-type pick-up unit arranged in a well formed along the central axis of the pivot pin and cooperating with magnetically soft walls of the pivot pin to detect magnetic changes resulting from the load variations.

16 Claims, 9 Drawing Figures

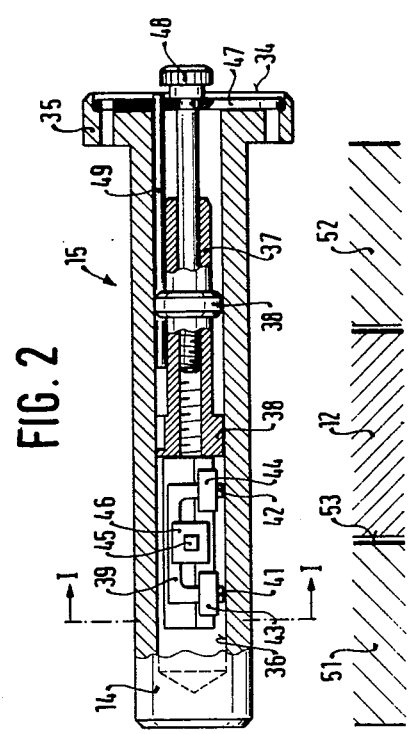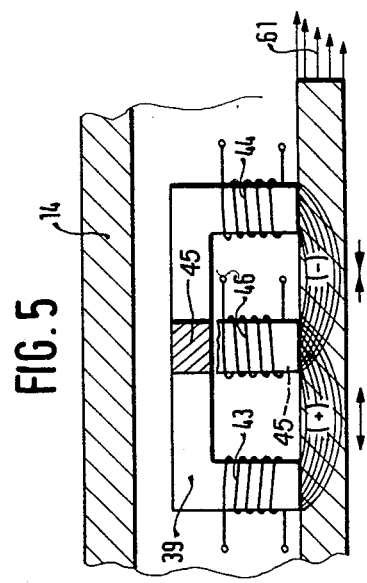

ELECTROHYDRAULIC CONTROL DEVICE FOR USE IN AGRICULTURAL MACHINES

BACKGROUND OF THE INVENTION

This invention relates in general to electrically controlled hydraulic control devices for a lifting unit of a mobile agricultural machine, particularly a farm tractor having a frame and a control rod pivotally secured to the frame by a pin, the rod being coupled to the lifting unit to move between an elevated position and a lowered position. Electrohydraulic control devices of this type are known, for example from U.S. Pat. No. 3,814,188, wherein each lower control rod of an electrohydraulically controlled three-point linkage is pivotally secured to the body of the tractor by means of a bending rod. Each bending rod has a cylindrical section between its rigidly clamped end and its free end supporting the lower control rod, whereby strain measuring straps are arranged on the upper surface of the cylindrical section to apply electrical signals proportional to forces transmitted by the lower control rods to an amplifier. Both bending rods together with their parts for supporting the strain measuring straps are arranged in the interior of a protective tube rigidly secured to the body of the tractor. The disadvantage of this prior-art control device is the fact that the construction and arrangement of the load-sensing device is very costly. In particular, there are necessary expensive bending rods made of a high quality material, and in addition the rods require a considerable installation space. Furthermore, the assembly of the load-sensitive gauge is difficult. In the case of a defect on the load-sensing gauge, the lower control bars as well as the protective tube together with the bending rods must be dismanteled. Accordingly, the installation of replacement parts is expensive as regards both installation time and material expenses. Also the leading out of electrical connection cables from the load-sensing straps to the electrical amplification circuits via bores in the protective pipe is relatively prone to interferences and cumbersome.

From the British Pat. No. 1,068,336 an electrohydraulic control device for operating a three-point linkage in a tractor is known, in which the load in the lower control rod is detected by means of strain-measuring straps. For this purpose each lower control rod is formed with an annular groove, the wall of which supports four circular strain-measuring straps connected in a bridge. The disadvantage of this solution is again the application of strain-sensing straps which are relatively sensitive to interferences. The mounting, interconnection and protection of the strain-sensing straps is time-consuming, predominantly manual operation. In addition, the straps are arranged in the movable parts of the tractor. As a result, the measuring signals are difficult to detect and the lower control rods supporting the strain-measuring straps must have a special design to enable the support. In the case of a defective strain-measuring pick-up, it is frequently necessary to exchange the entire lower control rod. Furthermore, the construction according to this British patent is difficult to assemble and is poorly suited for rough operational conditions of agricultural vehicles.

Furthermore, in the U.S. Pat. No. 3,516,498, an electrohydraulic control device for lifting units of a tractor is described, which cooperates with the lower control rod of the tractor. In this design, the lower control rod is linked via a rocking lever to the body of the tractor and additionally is linked to an elbow lever linkage. In order to measure loads taking place in the lower control rod there is provided an elbow lever link supported by a spiral spring and cooperating with an inductive displacement pick-up. The disadvantage of this solution is, in the first place, the high cost for the construction for measuring the load of the lower control rod.

From the publication of C. H. Rohrbach, "Handbuch für elektrisches Messen mechanischer Grössen," 1967, it is known how to employ magnet or elastic transformer pick-ups for measuring torques on a shaft. This transformer pick-up includes a stationary first magnetic core with primary coils and secondary coils, the core being applied to the shaft. Due to the tensile and compressive strains occuring in the shafts during the transmission of the torsional moment, the permeability of the shaft material alters and so alters the coupling between the coils of the pick-ups. From those coupling changes a measuring voltage can be derived that is proportional to the torque transmitted by the shaft. This known transformer pick-up, however, is limited to the measurement of torsional moments.

SUMMARY OF THE INVENTION

It is therefore a general object of the present invention to overcome the disadvantages of prior-art controlling devices for the lifting unit of agricultural machines.

More particularly, it is an object of the invention to provide an improved electrohydraulic control device of the above-described type that is simple and strong in its structure.

Another object of this invention is to provide such an improved control device which can be constructed at relatively low cost.

Still another object of this invention is to provide an electrohydraulic control device of the above-described type which operates without wear and is unaffected by rough operational conditions of the tractor.

An additional object of the invention is to provide such an improved control device that is easy to install in the tractor and can be used in cooperation with existing control devices.

In keeping with these objects, and others which will become apparent hereafter, one feature of the invention resides, in an electrohydraulic control device having at least one source of pressure medium, a hydraulic motor, a solenoid-controlled directional control valve for controlling the hydraulic motor, a pick-up means cooperating with the pivot pin of the control rod to generate electrical signals in response to mechanical forces acting on the pin, and controlling via the solenoid of the directional control valve the lifting unit to lift or lower the control rod in response to the increase or decrease of the mechanical forces acting on the pin, in forming the pivot pin of a soft ferromagnetic material and with a central well, the pick-up means including a magnetic core provided with windings and being arranged in the well to detect magnetoelastic changes in the pin.

Inasmuch as the pivot pin for supporting the bearing of the lower control rod is anyway present on the existing tractors, the application of the pivot pin as a part of the strain pick-up unit makes the construction costs of the latter relatively small. The pick-up unit is stationary and is not exposed to any frictional forces and it is very easy to install because the electrical connection cables lead from a stationary element.

Preferably, the magnetic pick-up is in the form of a transformer, the core of which forms with the soft magnetic wall of the pivot pin a double-closed magnetic circuit arranged in the range of the separation plane between the frame of the tractor and the bearing of the control rod. In this manner, the operational efficiency of the control device is considerably increased, and the resulting pick-up unit has a high linearity and is unsensitive to temperature changes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a longitudinal cross section of the pivot pin for a control rod of the tractor in FIG. 1, the pivot pin including magnetoelastic transformer pick-up unit;

FIG. 3 is a transverse cross section of the pivot pin of FIG. 2, taken along the line I—I;

FIGS. 4 and 5 indicate, respectively, the line of force of the magnetic flux and the vectors of the induced voltage in the transformer pick-up unit of FIG. 2;

DESCRIPTION OF THE PREFERRED EMBODIMENTS

Figure 1:
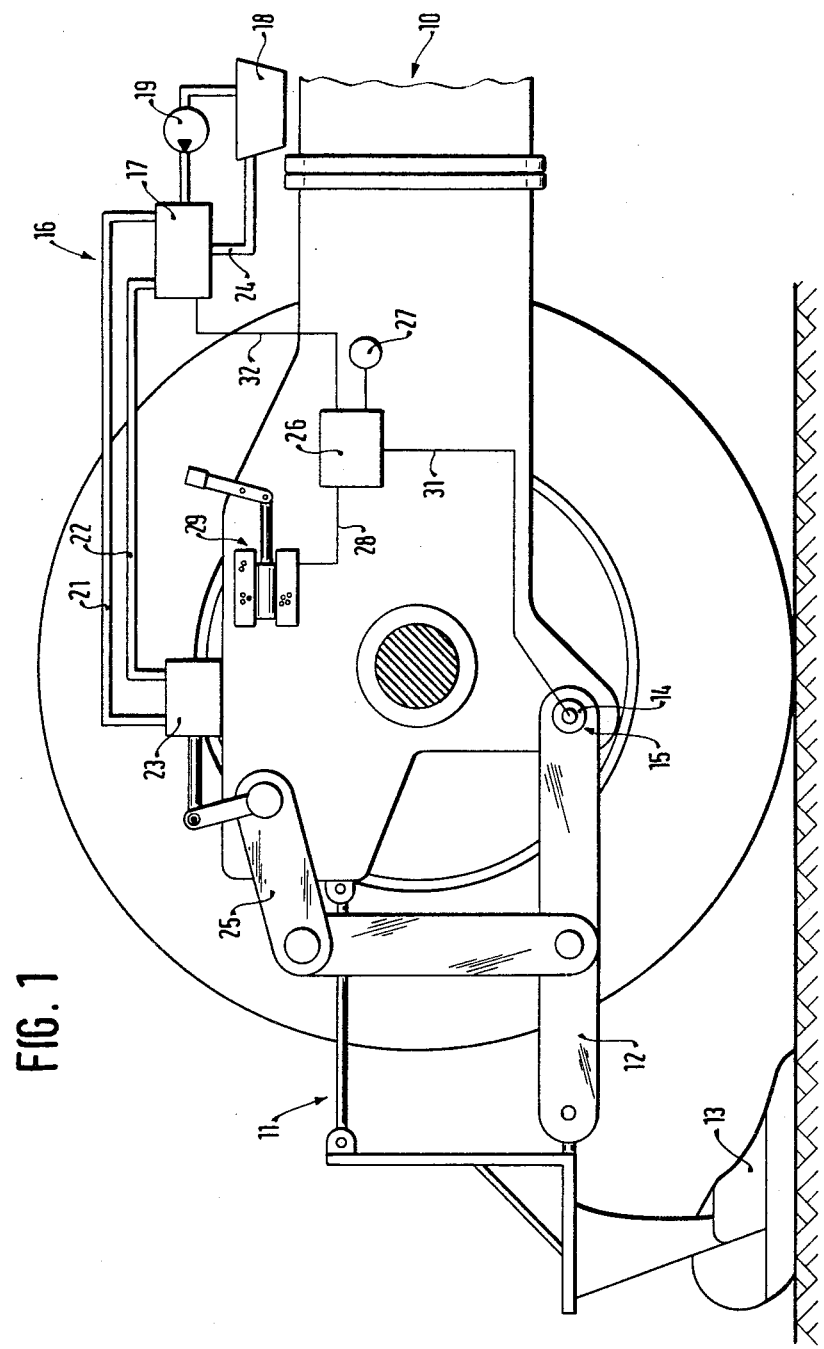
FIG. 1 illustrates a side view of a simplified electrohydraulic control device for a lifting unit on a tractor.
Figure 7:
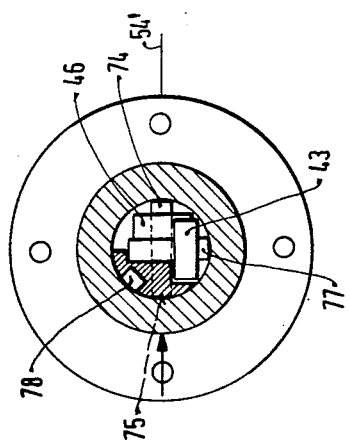
FIG. 7 is a cross section of the pivot pin according to FIG. 6 taken along the line II—II.
Figure 6:
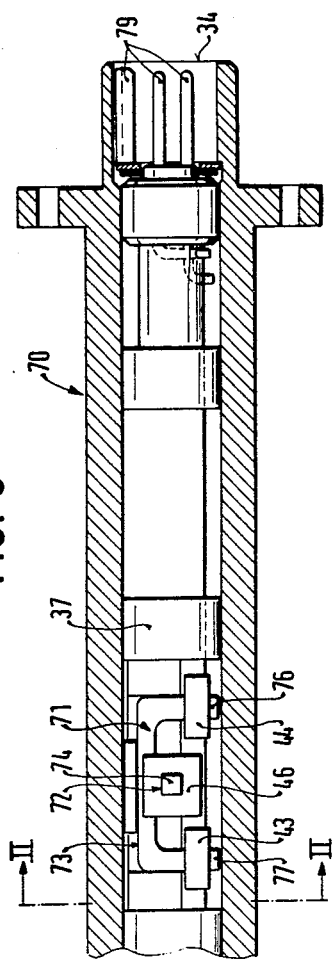
FIG. 6 is a longitudinal cross section of another embodiment of the combined pivot pin with transformer pick-up.
Figure 9:
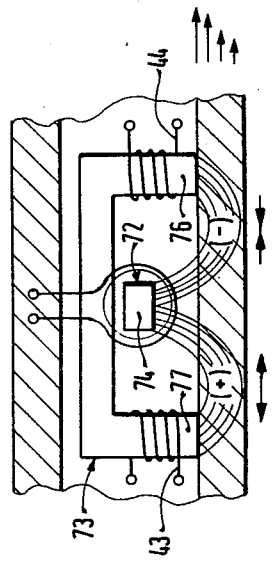
FIG. 9 is a view of the transformer pick-up similar to that of FIG. 6 with indicated lines of force of the magnetic flux and of the induced voltage vectors.

FIG. 1 illustrates the rear part of a tractor 10 provided with a conventional three-point linkage 11 including a lower control rod 12 through which a plow 13 for example, is moved. The lower control rod 12 is pivotally secured to the body of the tractor 10 by means of a pivot pin 14 that according to this invention forms simultaneously a component part of a magnetoelastic transformer-type pick-up unit 15. A hydraulic control device 16 is provided on tractor 10 to lift and lower the free end of the lower control bar 12. The hydraulic control device 16 includes a solenoid-controlled directional control valve 17 for controlling a flow of pressure medium delivered from a tank 18 by means of a pump 19. The directional control valve 17 controls via conduits 21 and 22 a hydraulic lifting unit 23 and communicates via a return conduit 24 with the tank 18. The lifting unit 23 is linked to the lower control rod 12 by means of linking rods 25 so as to selectively lift or lower the attached plow 13. The hydraulic control device 16 cooperates with an electronic control device 26 arranged on tractor 10 and connected to a power supply 27. The electronic control device 26 is further connected via a first electric conduit 28 to a desired value generator 29 and via a second electric conduit 31 to a transformer-type pick-up 15 which generates an actual value signal of the position of the lower control rod 12. A third electric conduit 32 connects the electronic device 26 to the solenoids of the directional valve 17.

The transformer-type pick-up 15 is illustrated in greater detail in FIGS. 2 and 3. One end of the bolt 14 is formed with a flange 35 and the end face 34 of the flange 35 communicates with an axial blind bore 36 extending to the proximity of the other end of the pin 14. An adjustment member 37 is inserted into the blind bore 36 and slidably guided therein by means of two collars 38. The inner end of the adjuster 37 facing the bottom of the blind bore 36 is connected to an E-shaped transformer core 39 defining two outer arms 41 and 42 arranged in the same plane and supporting, respectively, secondary coils 43 and 44. The central arm 45 of the E-shaped core 39 projects in a plane that is angularly displaced about 90° with respect to the plane of the end arms 41 and 42 and supports a primary coil 46. The length of respective core arms 41, 42 and 45 is designed such that the ends of respective arms are as close as possible to the inner wall of the blind bore 36 that is made of a soft magnetic material and thus closes the magnetic circuit of the transformer core 39. A cover disk 47 on the end face 34 of the flange 35 closes the blind bore 36. A setting screw 48 is rotatably mounted in the cover plate 47 and engages with its free end a threaded bore in the adjuster 37 to adjust the axial position of the latter and thus of the transformer core 39. In order to keep a fixed angular position of the axially movable adjuster 37 in the blind bore, a guiding rod 49 is secured to the cover 47 and projects along the inner wall of the blind pore through guiding recesses in the collars 38 of the adjuster.

Non-illustrated electrical conductors for connecting primary and secondary coils 43, 44 and 46 to the electronic control device 26 pass through openings in the guiding collars 38 and through the cover plate 47. The body of tractor 10 is provided with two bearing eyes 51 and 52 between which the bearing eye of the lower control rod 12 is supported for rotation on the pivot pin 14. The axial position of the transformer core 39 is adjusted such that the central arm 45 for the primary coil 46 is in the range of the separation plane 53 between the eye 51 and the lower control rod 12. In the range of the separation plane 53, the load acting on the pivot pin 14 is maximum. As illustrated in FIG. 3, load exerted by the lower control rod 12 acts upon the pivot pin 14 in the direction of dashed line 54. By means of this position adjustment of the transformer-type pick-up 39, it is attained that magnetic flux lines proceed through the pin 14 in the range of a high shearing stress. As mentioned before, pin 14 is made of a soft magnetic material to close the magnetic circuit of the core and to permit the aforementioned flow of magnetic field lines.

The operation of the electrohydraulic control devices on tractor 10 for regulating the lifting power exerted on the plow 13 is as follows: The principle of regulating lifting power of the lower control bar 12 is known per se and will be mentioned only briefly. By means of the desired value generator 29 there is preset a certain value of the lifting force acting on the lower control bar 12 during plowing. Strain exerted by plow 13 on the lower control bar 12 is detected by the transformer-type pick-up units 15 and converted into a proportional electrical value applied to the electronic control device 26. The device 26 compares the desired value signal from the first electrical conduit 28 with the actual value from the second electrical conduit 31. In the case when the two values are equal, no difference signal is applied via the third electrical conduit 32 to the solenoids of the directional control valve 17. As a result, the pump 19 is balanced by the directional control valve 17 that relieves pressure medium via return conduit 24 into the tank 18. As a consequence, the lifting unit 23 is hydraulically blocked and keeps, by means of lifting links 25, the lower control rod 12 and thus the plow 13 in its momentary position. If the force acting on the plow 13 and the lower control bar 12 changes, the actual value signal detected by the transformer-type pick-up unit 15 deviates from the desired value signal and the electronic control device 26 creates a difference signal for activating the solenoids of the directional control valve 17. The difference signal activates, by means of the solenoids, the directional control valve 17 in such a manner that pressure medium flowing from pump 19 to the lifting unit 23 causes the latter to move via lifting rods 25 the lower control bar 12 so long until the actual value signal delivered by the transformer-type pick-up unit 15 equals in magnitude to desired value signal generated by the generator 29. During this regulation of the lifting force, the pivot pin 14 transmits lifting forces from the lower control bar to the body of tractor 10 and operates simultaneously as a component part of the magnetoelastic transformer pick-up unit 15. The pick-up unit 15 takes advantage of the known effect that magnetic properties of certain materials change in response to a mechanical strain exerted on the material. Referring again to FIG. 2, the bearing eye of lower control bar 12 is located between two bearing eyes 51 and 52 rigidly connected to the body of the tractor. The axial position of the core 36 with its coils 43, 44 and 46 is set by means of the adjuster 37 so that the primary coil 46 with the supporting central core arm 45 is situated substantially in the range of the separation plane between bearing eye 51 and the lower control rod 12. Magnetic core 39 is thus situated in a range in which the pivot pin 14 is subject to maximum shearing stresses transmitted by the lower control rod 12. A constant voltage is applied to the primary coil 46 of the pick-up unit, and the measured voltage variations are tapped from the two secondary coils 43 and 44. The secondary coils 43 and 44 are connected to a signal difference measuring circuit in the device 26. In FIGS. 4 and 5, magnetic flux lines 55 and 56 resulting in the soft magnetic material of the pin 14 between the core arms 41 and 45, and 42 and 45 respectively are illustrated. If the direction of the mechanical strain in the bolt 14 changes, then change also lifting and compression stresses and consequently the direction of the induced electrical signal. Due to the magnetic elasticity of material of the bolt 14, permeability of the material in the range of the lifting stress 57 in the pivot pin 14 is increased, whereas in the range of the compression stress 58 the permeability is reduced. As a result, coupling between the primary coil 46 and the secondary coils 43 and 44 changes and in doing so it produces a measuring voltage proportional to the lifting force acting on the lower control rod 12. The axial guiding rod 49 fixed to the cover plate 47 ensures that the magnetic core 39 is always in a fixed angular position in the blind bore 36, and this fixed angular position is selected such that the bisectrix 59 between an outer arm 41 and the central arm 45 of the core is substantially perpendicular to the bisectrix 54, as illustrated in FIG. 3. It is attained in this manner that magnetic flux lines 55 and 56 pass through a region of the pivot pin 14 in which shearing stresses are maximum. Furthermore, by placing magnetic core 39 with its coils into the interior of the pivot pin 14 an increased measuring signal is achieved because the flow of shearing stresses 61 in the wall of a tubular member increases from the outer surface towards the inner surface of the tube as indicated schematically by arrows in FIG. 5. For the sake of clarity, the intermediate core arm 45 with coil 46 is illustrated in FIG. 5 as a cut away part turned about 90° with respect to its actual orientation.

Figure 8:
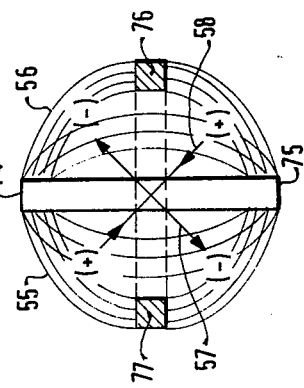
FIG. 8 is a sectional bottom view of the transformer pick-up according to FIG. 6 with indicated magnetic flux and induced voltage vectors.

FIGS. 6–9 show another embodiment of the transformer-type pick-up unit 70. Component parts similar to those in the pick-up unit 15 in the preceding example according to FIGS. 2–5 are indicated by like reference numerals. The modified transformer-type pick-up unit 70 distinguishes over that according to FIG. 2 in a different configuration of its magnetic core 71. The latter consists of a first core part 72 having a rod-like shape and supporting a primary coil 46, and of a second, U-shaped core part 73 supporting on its respective shoulders or arms secondary coils 43 and 44. The first core part 72 corresponds in length to the inner diameter of the blind bore 36 and defines two opposite poles 74 and 75. The longitudinal axis of the core part 72 is directed perpendicular to the plane coinciding with the center axis of the second core part 73. Poles 74 and 75 of the first core part 72 and the two poles 76 and 77 of the second core part 73 are therefore situated in contact with the inner wall of the blind bore at the ends of diagonals of a square area, as depicted in FIG. 8. The longitudinal axis of the first core part 72 lies in the direction of the lifting force of the lower control rod, and consequently magnetic flux lines 55 and 56 in the tubular wall of the pin 14 extend in the range of maximum strain. A leaf spring 78 urges poles 74–77 of the transformer core 71 against the wall of the blind bore 36. The electrical connection cables of the pick-up unit 70 are connected to respective contacts of a connector 79 mounted at the flanged end 34 of the pick-up unit 70.

The operation of the second embodiment of the transformer-type pick-up unit 70 is in principle similar to the operation of the pick-up unit 15. Due to the four-pole design of the transformer core 71, however, a substantially higher useful signal is generated, and construction costs are reduced.

By virtue of the novel combination of a bearing pin for the lower control rod of a tractor with a magnetoelastic transformer-type pick-up unit, a simple and sturdy construction of the electrohydraulic control device for regulating lifting forces of a farm tractor can be achieved, and operation is rendered considerably more reliable in comparison with prior-art devices of this type. In the arrangement according to this invention, no additional construction parts, such as expensive bending—or torsion springs or linking elements are necessary. The transformer-type pick-up unit, due to its encapsulation in the interior of the pivot pin is protected against fouling, and consequently is particularly suitable for operation under rough conditions of an agricultural mobile machine. In addition, the pick-up unit of this invention is easy to install and, in the event of a malfunction, it can be easily exchanged. Furthermore, it is also advantageous that the construction and arrangement of the pick-up unit permits a fixed installation of electrical conductors that are fixedly connected to a stationary element of the tractor body. It is also particularly advantageous that the axial position of the transformer core 39 can be adjusted relative to the separation plane 53 between the stationary and movable parts of the bearing, so that a maximum measuring signal is generated whereby the angular position of the core remains constant with respect to the direction of load in the lower control bar 12. An improvement also results from the provision of two secondary coils and one primary coil on corresponding arms of the transformer core, because this arrangement permits the operation on the principle of the signal-difference measuring method. The pivot pin forming the part of the pick-up unit can also be used in modified bearings where the control rod is unilaterally secured to a fixed bearing eye on the tractor housing.

It will be understood that each of the elements described above, or two or more together, may also find a useful application in other types of constructions differing from the types described above. For instance, a separate transformer-type pick-up unit can be provided for each of the lower control rods on the tractor and can be electrically connected to a common electronic control device 26. The electrohydraulic control device of this invention can be employed also in other types of agricultural machines such as combine harvesters and threshers in which the problem of controlling lifting forces of pivotally mounted component parts in response to electrical measuring signals derived from mechanical loads takes place. The design of the transformer-type pick-up unit 15 permits also the application of more than three transformer coils if it is desirable to still increase the detected signal. It is also possible to adjust the axial position of the core of the pick-up unit to another location relative to the bearing of the control rod, for example opposite to the separation plane between the control rod 12 and the outer bearing eye 52 on the machine frame. Also the angular position of the transformer core can be turned about 180° relative to that as illustrated in FIG. 3. Furthermore, the regulation of the lifting force can be extended to other kinds of regulation, for example position regulation, pressure regulation or a combined regulation. Materials used for the pivot pin 14 are soft magnetic material the relative permeability of which either increases or decreases in response to the applied mechanical load.

In still another modification, it is also possible to employ a transformer-type pick-up unit having a single coil, the so-called reaction coil. The core of the pick-up unit in the latter case has a U-shaped configuration supporting a so-called differential reaction coil.

While the invention has been illustrated and described as embodied in an electrohydraulic control device for use with agricultural machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electrohydraulic control device for use in connection with a lifting unit of an agricultural mobile machine, particularly a tractor having a frame, a control rod coupled to said lifting unit, a pivot pin mounted on said frame for pivotally supporting said control rod, said control device comprising at least one source of pressure medium, a hydraulic motor; a solenoid-controlled directional control valve for controlling the hydraulic motor; a pick-up means cooperating with said pivot pin to generate electrical signals in response to mechanical forces acting on said pin, said pick-up means controlling via the solenoid of said directional control valve said lifting unit to lift or lower said control rod in response to the increase or decrease of the mechanical forces acting on the pin; said pick-up means including a magnetic core, said core supporting at least one induction coil, said pivot pin being formed with an axial well having a wall of a soft magnetic material, and said core being arranged in said well to detect magnetic changes in said wall material resulting from the applied mechanical forces.

2. An electrohydraulic control device as defined in claim 1, wherein said magnetic core is arranged in the range of the separation plane between a part of said frame and said control rod.

3. An electrohydraulic control device as defined in claim 1, wherein said pick-up means includes a transformer-type pick-up element arranged in said well.

4. An electrohydraulic control device as defined in claim 3, wherein said pick-up element includes a core having an arm for supporting a primary coil and another arm for supporting a secondary coil, the two arms of the core being arranged in planes forming with each other a right angle, and the bisectrix between the two planes being directed substantially perpendicular to the direction of the lifting force acting on the control rod.

5. An electrohydraulic control device as defined in claim 3, wherein said core is formed with a central arm and two lateral arms, the two lateral arms supporting respectively a secondary coil and the central arm supporting a primary coil, and further including a common electronic unit connected to respective secondary coils for generating a difference signal.

6. An electrohydraulic control device as defined in claim 5, wherein said core has an E-shaped configuration defining two lateral arms for supporting respectively a secondary coil and a central arm for supporting a primary coil.

7. An electrohydraulic control device as defined in claim 3, further including an axial adjuster arranged in said well and being mechanically connected to said core.

8. An electrohydraulic control device as defined in claim 7, further including means for adjusting the angular position of said core relative to the wall of said well.

9. An electrohydraulic control device as defined in claim 8, wherein said angular position adjusting means includes a cover plate secured to an end face of the pin to close said well, and said axial adjuster includes a setting screw rotatably supported in said cover plate and engaging a sliding carrier movable in axial direction in said well.

10. An electrohydraulic control device as defined in claim 9, further including a guiding rod secured to said cover plate and projecting into said well to engage guiding recesses in said sliding carrier.

11. An electrohydraulic control device as defined in claim 9, wherein electrical conductors from the coils of said pick-up element lead through said sliding carrier and said cover plate.

12. An electrohydraulic control device as defined in claim 1, wherein said magnetic core includes a rod-like first core part supporting a primary coil and defining two opposite magnetic poles, said rod-like part being oriented substantially in the direction of the lifting force acting on the control rod.

13. An electrohydraulic control device as defined in claim 12, wherein said magnetic core further includes a second, U-shaped core part defining two arms each supporting a secondary coil and being oriented substantially perpendicularly to the longitudinal axis of said first core part.

14. An electrohydraulic control device as defined in claim 13, wherein the ends of respective core parts coincide with corner points of a square area.

15. An electrohydraulic control device as defined in claim 12, wherein the length of said rod-like first core part corresponds substantially to the diameter of the well in said pivot pin.

16. An electrohydraulic control device for use in connection with a lifting unit of an agricultural mobile machine, particularly a tractor having a frame, a control rod coupled to said lifting unit, a pivot pin mounted on said frame for pivotally supporting said control rod, said control device comprising at least one source of pressure medium; a hydraulic motor; a solenoid-controlled directional control valve for controlling the hydraulic motor; a pick-up means cooperating with said pivot pin to generate electrical signals in response to mechanical forces acting on said pin, said pick-up means controlling via the solenoid of said directional control valve said lifting unit to lift or lower said control rod in response to the increase or decrease of the mechanical forces acting on the pin; said pick-up means including a magnetic core, said core supporting at least one induction coil, said pivot pin being formed with a well having a wall of a soft magnetic material, said core being arranged in said well to detect magnetic changes in said pin material resulting from the applied mechanical forces, said magnetic core including a rod-like first core part supporting a primary coil and defining two opposite magnetic poles, said rod-like part being oriented substantially in the direction of the lifting force acting on the control rod, a sliding position adjuster connected to the core, and a spring element arranged on said position adjuster to urge respective core parts against the wall of said well.

* * * * *